United States Patent [19]

Yoshimura et al.

[11] Patent Number: 4,619,147

[45] Date of Patent: Oct. 28, 1986

[54] LOAD CELL HAVING FLAMEPROOF FUNCTION

[75] Inventors: Shigeo Yoshimura, Kawanishi; Yoshiaki Shimada; Hitoshi Kimura, both of Nara, all of Japan

[73] Assignee: Kubota Ltd., Osaka, Japan

[21] Appl. No.: 648,894

[22] Filed: Sep. 10, 1984

[30] Foreign Application Priority Data

| Nov. 21, 1983 | [JP] | Japan | 58-180805[U] |
| Nov. 21, 1983 | [JP] | Japan | 58-220008 |
| Nov. 29, 1983 | [JP] | Japan | 58-226610 |
| Nov. 29, 1983 | [JP] | Japan | 58-226611 |
| May 15, 1984 | [JP] | Japan | 59-97908 |
| May 15, 1984 | [JP] | Japan | 59-97909 |

[51] Int. Cl.$^4$ .......................... G01L 1/26; G01L 1/22
[52] U.S. Cl. ........................ 73/862.38; 73/862.65; 177/243
[58] Field of Search .......... 73/862.38, 862.48, 862.63, 73/862.64, 862.65, 862.66, 431, 855; 220/88 R; 177/180, 238, 243

[56] References Cited

U.S. PATENT DOCUMENTS

| 2,414,161 | 1/1947 | Moore | 73/862.38 |
| 3,213,680 | 10/1965 | Schaefer | 73/862.38 |
| 3,363,456 | 1/1968 | Laimins | 73/862.65 |
| 3,763,701 | 10/1973 | Wright et al. | 73/862.48 |
| 4,320,809 | 3/1982 | Knuthe et al. | 177/243 |

*Primary Examiner*—Charles A. Ruehl
*Attorney, Agent, or Firm*—W. G. Fasse; D. H. Kane, Jr.

[57] ABSTRACT

A load cell (24, 31, 40, 51, 58, 62, 64, 68, 92, 96, 97) having flame proof function has a load cell body (2) and a flame proof enclosure (25, 33, 36, 41, 69, 78) for covering at least a strain gage carrying portion (5) of the load cell body (2). A load receiving portion (4) connected with the strain gage carrying portion (5) for transmitting a load to the strain gage carrying portion, projects outwardly from the flame proof enclosure. A gap (30) is defined between a first surface of the load cell body and a second surface of the enclosure, so that the load receiving portion (4) and the strain gage carrying portion (5) are freely movable relative to the enclosure. The size of the gap width $W_1$ and of the gap length $L_1$ are selected for realizing the flame proof function.

18 Claims, 24 Drawing Figures

$L_1 = L_5 + L_6$

LOAD CELL HAVING FLAMEPROOF FUNCTION

BACKGROUND OF THE INVENTION

The present invention relates to a flame proof load cell, and more particularly, it relates to a flame proof load cell adapted for measuring a wide range of loads including large and small loads.

DESCRIPTION OF THE PRIOR ART

A load cell which is part of equipment for treating explosive gases, such as acetone and coal gas, must be flame proof and of explosion-protected construction. The flame proof load cell must be so constructed that, even if an explosive gas enters the load cell flowing around the strain gages and is caused to explode by heat generation, short circuits etc. of the strain gages in the cell, the energy of explosion is kept within the load cell while any flame propagation outwardly of the load cell is prevented to avoid spreading of the explosion to the whole equipment.

FIG. 1 shows a typical example of a conventional compression type load cell 1 having a flame proof function and including a load cell body 2 in a flame proof enclosure 3. The load cell body 2 is made of a cylindrical, resilient material having a load receiving portion 4, a strain gage carrying portion 5, and a fixed portion 6. The load receiving portion 4 is adapted to receive a load 7 on its rounded upper face. The strain gage carrying portion 5 is thinned to be narrower than the other two portions, and strain gages 8 are stuck to the outer surface thereof. The strain gages 8 are connected to a well-known electric circuit or electronic circuit (not shown) for indicating the measured values. The fixed portion 6 is engaged in and fixed to a recess defined in the central portion of the inner bottom surface of the bottom 9 of the flame proof enclosure 3. The flame proof enclosure 3 is a cylindrical vessel closed at one end by its bottom 9 and is open at its upper end so that the upper end of the load receiving portion 4 slightly projects upwardly from the central portion of the upper opening. An upper diaphragm 10 is fitted between the flame proof enclosure 3 and the load cell body 2 to close the upper opening. The inner peripheral edge of the upper diaphragm 10 is welded to the load cell body 2 in the vicinity of the upper end of the load receiving portion 4 while the outer peripheral edge thereof is welded to the upper end of the flame proof enclosure 3. The upper diaphragm 10 cooperates with the flame proof enclosure 3 to make the so enclosed space flame proof when the load cell should be exposed to an explosion accident. On the other hand, a lower diaphragm 12 is mounted between a substantially central inner side surface of the flame proof enclosure 3 and the load cell body 2. The lower diaphragm 12 may be made of soft steel, for example, and has holes 13 to provide more elasticity. The lower diaphragm 12 is adapted to support the load cell body 2 in the flame proof enclosure 3, so as to prevent tilting of the load cell body 2 when the load receiving portion 4 is subjected to a load in an inclined direction.

The compression type load cell 1 further includes a metal support member 14 which is mounted to the outside of the bottom portion 9 and is rotatably arranged on a fixed table 16 through a steel ball 15.

In the aforementioned construction, when a vertical load 7 is applied to the upper end surface of the load receiving portion 4, the load cell body 2 is compressed downwardly. Therefore, from a microscopic viewpoint, the upper and lower diaphragms 10 and 12 are bent downwardly about their inner peripheral edges fixed to the load receiving portion 4 with respect to the outer peripheral edges fixed to the flame proof enclosure 3. Then the vertical load 7 applied to the load receiving portion 4 is converted into a resistance value change of the strain gages 8 stuck to the strain gage carrying portion 5, whereby the measured value is indicated on an indicator or the like by any well-known electronic means.

Even if an explosive gas filling the space 11 defined by the flame proof enclosure 3 and the upper diaphragm 10 is caused to explode by heat generation, accidental short circuits etc. of the strain gages 8, outward spreading of the energy of explosion is prevented by the flame proof enclosure 3 and the upper diaphragm 10, while any outward flame propagation through any gap between the flame proof enclosure 3 and the upper diaphragm 10 is prevented.

In such a conventional structure, it is necessary to increase the compressive strength of the upper diaphragm 10 by thickening the same, thereby to improve the flame proof function of the load cell 1. In this case, however, since the load receiving portion 4 and the upper diaphragm 10 are fixed to each other, the vertical load 7 applied to the load receiving portion 4 is undesiredly supported or absorbed by the upper diaphragm 10, leading to an incorrect transmission of a vertical load 7 through the load receiving portion 4 to the strain gage carrying portion 5 and an incorrect measurement of the load is the result.

Thus, such a conventional flame proof type load cell 1 has been applied exclusively to measuring large loads, and has not been used for measuring medium or small loads in practice.

FIG. 2 shows a typical example of a conventional beam type load cell 17 having a horizontally arranged cylindrical load cell body 2 functionally divided into a load receiving portion 4, a strain gage carrying portion 5 and a fixed portion 6. The load receiving portion 4 has a reduced size, except for its righthand end portion, to define upper and lower surfaces, for applying a vertical load 7 to its upper surface. The right-hand base end of the fixed portion 6 is also reduced in size to define upper and lower surfaces for securing the beam type load cell to a fixed table 18 by bolts 19. With respect to the strain gage carrying portion 5 between the load receiving portion 4 and the fixed portion 6, the load cell body 2 is formed of a square rod. In the center of the strain gage carrying portion 5, several through-holes 20 communicating with each other are formed perpendicularly to the longitudinal direction of the load cell body 2. The holes 20 extend horizontally and form a Roberval mechanism 21. Strain gages 8 connected to a well-known electronic circuit, not shown, are secured to thinned portions 22 of the upper and lower surfaces of the Roberval mechanism 21. The strain gage carrying portion 5 is covered by a bellows 23, both ends of which are respectively mounted to the load receiving portion 4 and the fixed portion 6.

In the aforementioned construction, the bellows 23 protects the strain gage carrying portion 5 against dust or the like and is made of flexible material such as rubber. However, for making the beam type load cell 17 flame proof, the bellows 23 must be made of a suitable metal of increased thickness as compared to the rubber bellows. In such a case, however, the strain gage portion 5 is undesiredly supported by the bellows 23, leading to an incorrect measurement of the load.

Thus, it has been difficult to provide such conventional beam type load cell 17 with a flame proof function. In particular, it has been very difficult to manufacture a beam type load cell for measuring small loads 7.

As hereinabove described with respect to typical examples of two types of conventional load cells, the requirement of flame proofing is not compatible with the requirement of load application because for the latter a load receiving portion of the load cell must be exposed while the former requires sealing at least a strain gage carrying portion in the solid sealed flame proof enclosure. As a result, the load to be measured is supported not only by the load cell body but undesirably also by the enclosure, leading to incorrect measurements of the load. The problems caused by such incompatibility has not yet been settled in the prior art.

SUMMARY OF THE INVENTION

The invention is based on the recognition that for correctly measuring loads by a load cell, the strain gage carrying portion of the load cell body must not be fixed in the enclosure. Rather, it is necessary to define a gap between the load cell body and the enclosure. Such gap must be so constructed that flame propagation cannot occur through the gap.

An object of the present invention is to provide a flame proof load cell capable of measuring large and small loads.

In another aspect, the present invention is applicable to any compression, tension and beam type load cells requiring an explosion-protected construction which can correctly measure loads.

A load cell according to the present invention includes a load cell body, a load receiving portion connected with the load cell body to transmit a load in a predetermined load direction and a flame proof enclosure. The enclosure surrounds the load cell, except for an opening for outwardly exposing the load receiving portion to a load. The load cell body further includes a first surface in the vicinity of the opening in the enclosure, said enclosure having a second surface opposite said first surface, said first and second surfaces facing each other along a predetermined length, said first and second surfaces being spaced from each other for forming a gap between said first and second surfaces, said gap having a predetermined gap width. The gap width and the gap length defined between the first and second opposing surfaces are so selected as to keep the energy of an explosion caused inside the enclosure for preventing any flame propagation through the gap out of the enclosure.

Since the load receiving portion connected with the load cell body is free to move relative to the enclosure through the opening forming the gap, a load which is applied to the load receiving portion will not be undesiredly supported by the enclosure, whereby the load is correctly transmitted to the load cell body to facilitate a correct measurement of the load.

A preferred embodiment of the present invention may be applied to a beam type load cell in which a load cell body extends in a direction perpendicular to the load direction. Another embodiment of the present invention may be applied to a compression type load cell in which a load cell body extends in the same direction as the load. Still another embodiment of the present invention may be applied to a tension type load cell in which a load cell body also extends in the same direction as the load.

In each of the embodiments, the energy of explosion caused in the enclosure is effectively kept within the enclosure by the gap width and the gap length through the gap defined between the load cell body and the enclosure member, whereby any flame propagation through the gap is prevented.

Each of the compression type and tension type load cells may be so constructed that the direction of deformation of the load receiving portion extends perpendicularly to the cross direction of the gap, whereby the width of the gap is continuously maintained at a predetermined value with respect to the change of the load receiving portion. Further, the relation between the load direction of the load receiving portion and the cross direction of the gap may be selected so that it is not perpendicular whereby the gap width is reduced when the maximum load is applied to the load receiving portion. In this situation any flame propagation through the gap is also prevented.

The above and other objects, features, aspects and advantages of the present invention will become more apparent from the following detailed description of the present invention when taken in conjunction with the accompanying drawings.

Figure 3:
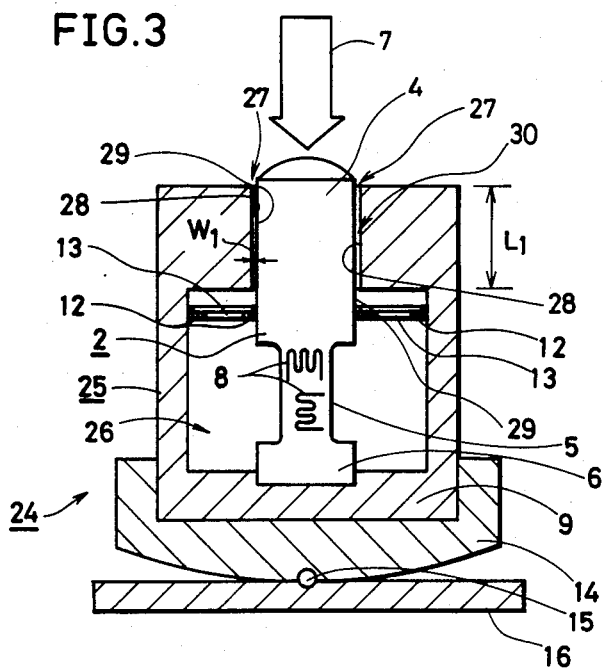
FIG. 3 shows a sectional view through a first embodiment of the present invention applied to a basic compression type load cell.

DESCRIPTION OF THE PREFERRED EMBODIMENTS:

In FIG. 3, the compression type, flame proof load cell 24 includes a load cell body 2 and a flame proof enclosure 25. The load cell body 2 is made of cylindrical rigid material and is functionally divided into a load receiving portion 4, a strain gage carrying portion 5 and a fixed portion 6. The flame proof enclosure 25 forms an internal space 26 containing at least the strain gage carrying portion 5 of the load cell body 2. The flame proof enclosure 25 further has an opening 27 for outwardly exposing the forward end of the load receiving portion 4 of the load cell body 2. The compression type load cell 24 according to the present embodiment is characterized in that a gap 30 is formed between the outer surface 29 of portion 4 and the inner surface 28 of the opening 27. The gap 30 has a width $W_1$ and a length $L_1$ depending in their size on various factors. In other words, the gap width $W_1$ and the gap length $L_1$ are so selected that the energy of an explosion caused in the internal space 26 of the flame proof enclosure 25 is kept within the interior thereof since any flame is prevented from propagation outwardly of the flame proof enclosure 25.

The sizes of the load cells are set, in case of the load cell 24 used, e.g., in Japan, on the basis of "Industrial Safety Institute Technical Guideline", a report by Industrial Safety Institute, RIIS-TR-79-1, published on Nov. 15, 1979, copyright by Industrial Safety Institute of the Ministry of Labor, page 57, "3231 Joint". For example, where the internal space 26 of the flame proof enclosure 25, excluding the space occupied by the load cell body 2, is over 2 cm$^3$ up to 100 cm$^3$, the sizes of the gap 30 are selected in such a manner that the length $L_1$ is over 10 mm and the gap width $W_1$ is up to 0.1 mm (in case of a class 2 explosion).

In employing a load cell of the present invention in a different country, what must be considered is that the geometry of the gap 30 of the load cell is selected to meet the standard adopted in that country.

The fixed portion 6 of the load cell body 2 is secured to the central portion of the inner bottom surface of the flame proof enclosure 25, while the load receiving portion 4 extends freely through the opening 27 of the flame proof enclosure 25 with the aforementioned gap 30 defined therebetween. Therefore, a vertical load 7 applied to the upper end surface of the load receiving portion 4 is not undesirably supported by the aforementioned upper diaphragm 10 of the prior art, whereby a load is measured correctly. Further, even if an explosive gas entering the internal space 26 through the gap 30 is caused to explode by heat generation, accidental short circuits etc. of the strain gages 8 or the like, the energy of the explosion in the internal space 26 is kept within the flame proof enclosure 25 because the flame is prevented from propagating outwardly of the enclosure 25 since the gap width $W_1$ and the gap length $L_1$ are selected in predetermined safety sizes as hereinabove described.

Figure 1:
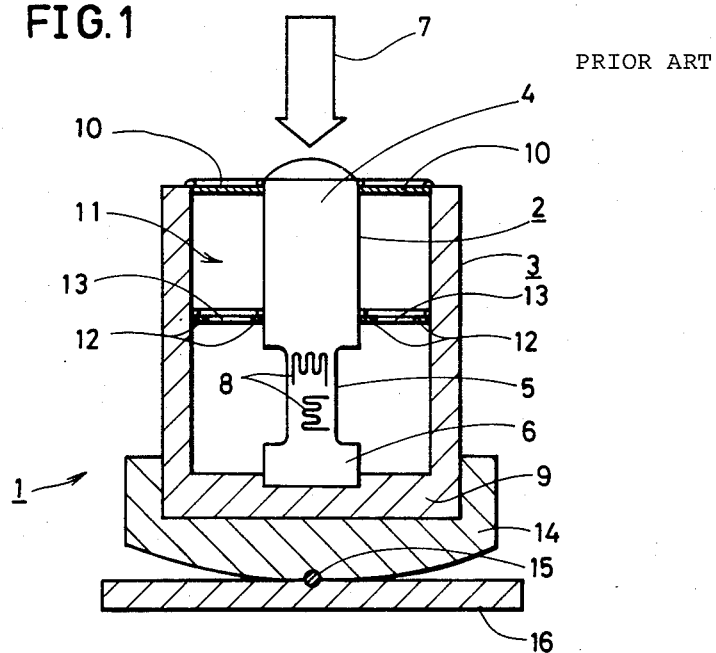
FIG. 1 is an illustration showing a typical example of a conventional compression type load cell having a flame proof function.

Other components of this embodiment are identical in construction to those of the example as shown in FIG. 1, and thus explanation is omitted with respect to components designated by the same reference numerals.

Figure 4:
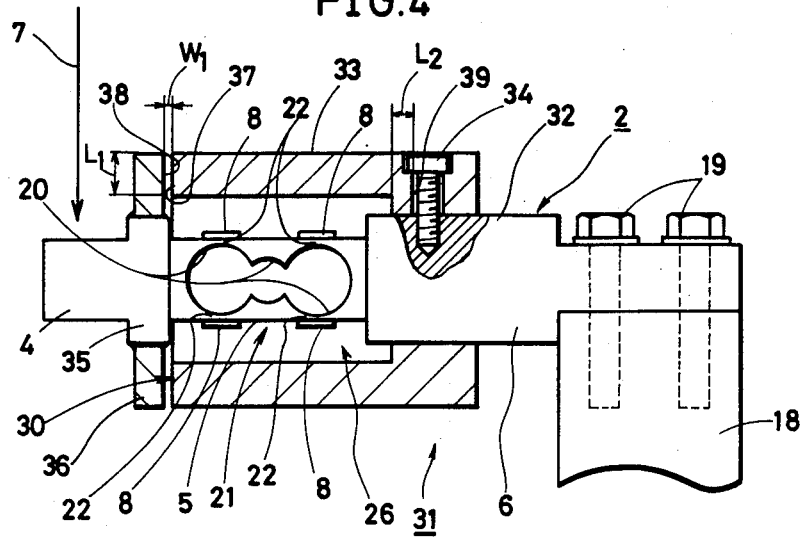
FIG. 4 shows, partially in section, a second embodiment of the present invention applied to a basic beam type load cell.

FIG. 4 shows a second embodiment of the present invention applied to a basic beam type flame proof load cell 31 comprising a horizontally arranged load cell body 2 which may functionally be divided into a load receiving portion 4, a strain gage carrying portion 5 and a fixed portion 6.

The fixed portion 6 has a cylindrical section 32 projecting leftwardly from a fixed support 18, such that a cylindrical cover 33 is fixed at its right-hand end portion to the peripheral surface of the cylindrical section 32 by a screw 34. The inner peripheral surface of the right-hand end of the cylindrical cover 33 is in close contact with the outer peripheral surface of the fixed portion 6. The cylindrical cover 33 is adapted to cover at least the strain gage carrying portion 5 and is open at its left-hand end portion. A rounded section 35 in the ring-hand peripheral surface of the load receiving portion 4 is in close contact with the inner peripheral surface 38 of a right-shaped opposed surface member 36 extending in a direction perpendicular to the longitudinal direction of the load cell body 2. The ring member 36 is secured to the rounded section 35, e.g., by welding. A gap 30 is defined between an open end surface 37 at the left side of the cylindrical cover 33 and the surface 38 of the ring member 36. The gap width $W_1$ and the gap length $L_1$ are determined as in the case of the aforementioned compression type load cell 24 (see FIG. 3) so that the energy of an explosion caused in the internal space 26 defined by the cylindrical cover 33 and the ring-shaped opposing surface member 36, is not transmitted outwardly because an outward flame propagation is prevented through the gap 30.

Further, for preventing flame propagation through a gap defined between the outer peripheral surface of the fixed portion 6 and the inner peripheral surface of the cylindrical cover 33, a length $L_2$ between the internal space 26 and an external part, e.g., a bolt hole 39 is selected in a predetermined size, e.g., over 6 mm based on the aforementioned "Industrial Safety Institute Technical Guideline" in a case where the load cell is used in Japan.

Figure 2:
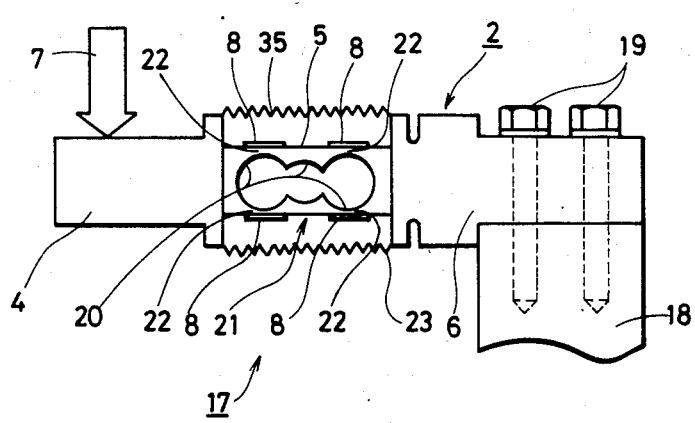
FIG. 2 is an illustration showing a typical example of a conventional beam type load cell.

Since other components of the embodiment are identical in other respects to the load cell 17 shown in FIG. 2, an explanation of other components having the same reference numbers as in FIG. 2, is omitted.

Figure 5:
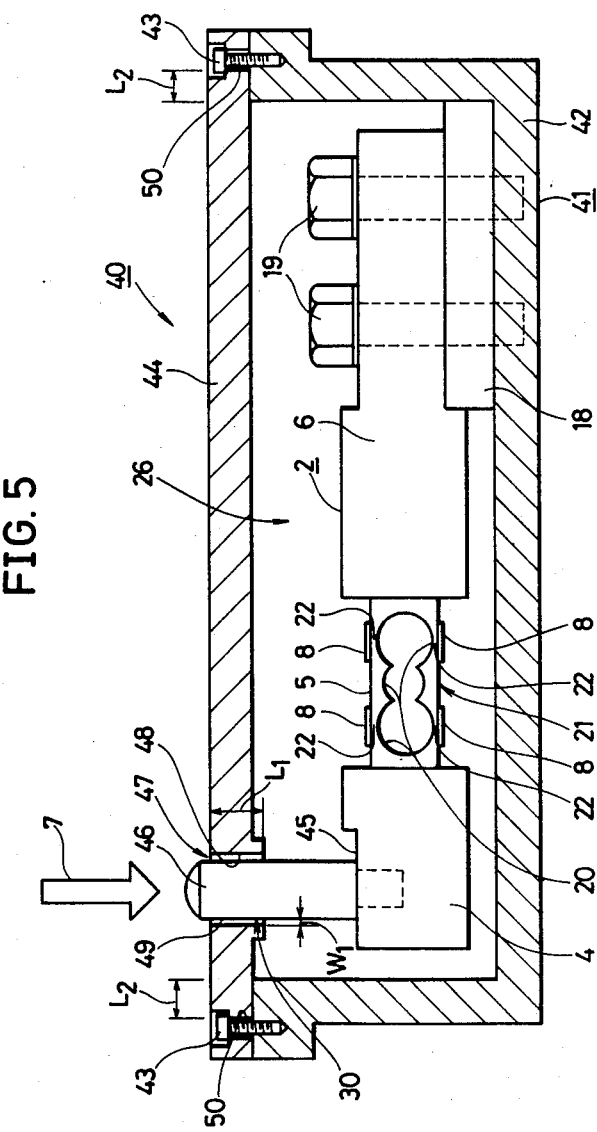
FIG. 5 is a sectional view through a third embodiment of the present invention applied to a beam type load cell.

FIG. 5 is a front cross-sectional view of a beam type load cell 40 according to the third embodiment wherein the entire load cell body 2 is contained in a flame proof enclosure 41 comprising an upwardly open housing 42 and an upper lid member 44 connected to the upper surface of the housing 42 by screw bolts 43. The load cell body 2 is secured to a fixed plate 18 located in the right-hand end portion of the inner bottom surface of the enclosure body 42 by bolts 19. The fixed plate 18 may be connected with the housing 42 by welding etc.

or fixed to the housing with the fixed portion 6 of the load cell body 2, by the bolts 19 as shown in FIG. 5.

A load receiving portion 4 of the load cell body 2 is partially reduced in size to define an upper flat surface 45, to which is fixed a vertically upwardly extending cylindrical rod 46. A through-hole 47 is formed in the vicinity of the left-hand end portion of the upper lid member 4. The rod 46 is adapted to pass through the through-hole 47 of the upper lid member 44 such that the upper end thereof projects upwardly from the upper lid member 44. A load 7 is applied to the upper end surface of the rod 46.

In the present embodiment, a gap 30 defined between an inner peripheral surface 48 of the through-hole 47 and an opposed outer peripheral surface 49 of the rod 46 again has the gap width $W_1$ and the length $L_1$ dimensioned to provide the desired flame proof feature. Since the direction of the gap length $L_1$ corresponds, in this case, to that of displacement direction of the rod 46 caused by an application of the load 7, the gap width $W_1$ is hardly changed even if the rod 46 is displaced in the load direction by application of the load 7, whereby the aforementioned predetermined size is almost stably maintained.

For preventing outward flame propagation through a clearance between the joint of the enclosure body 42 and the upper lid member 44, the length $L_2$ of the joint between an internal space 26 of the enclosure 41 to the nearest external component, i.e., a bolt hole 50 for the bolt 43, is selected to have a safety size as in the aforementioned second embodiment, e.g., to be over 6 mm based on the "industrial Safety Institute Technical Guideline".

Since other components of the load cell body 2 are constructed identically to those of the embodiment as shown in FIG. 4, an explanation is omitted of those components having the same reference numerals.

Figure 6:
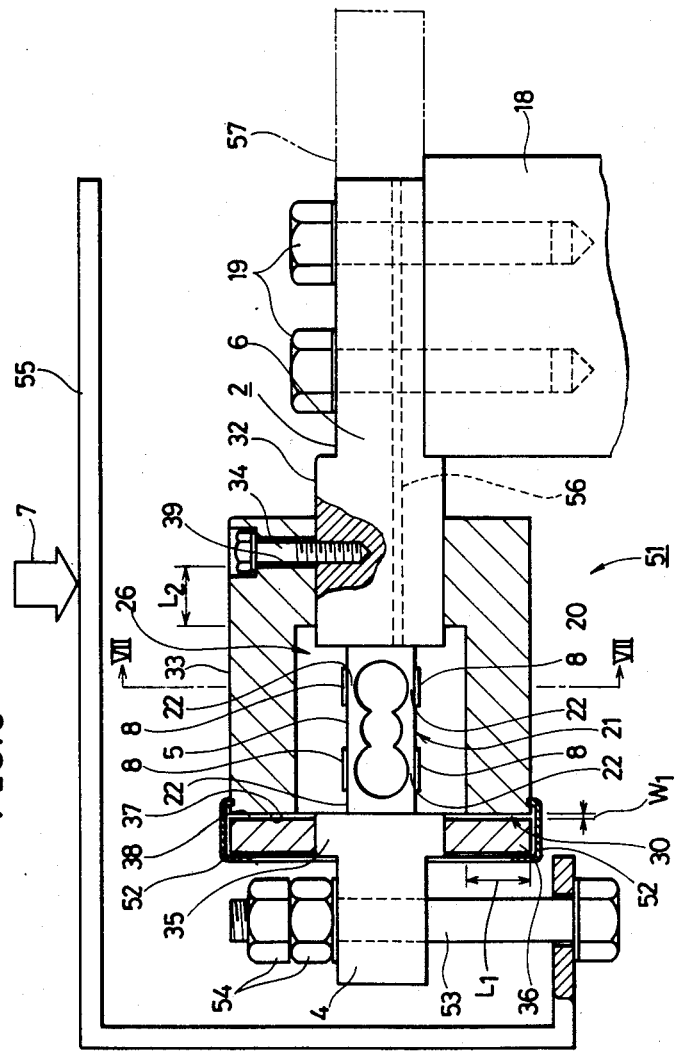
FIG. 6 is an elevational view, partially in section, of a fourth embodiment of the present invention applied to a beam type load cell basically identical in its construction to the second embodiment.
Figure 7:
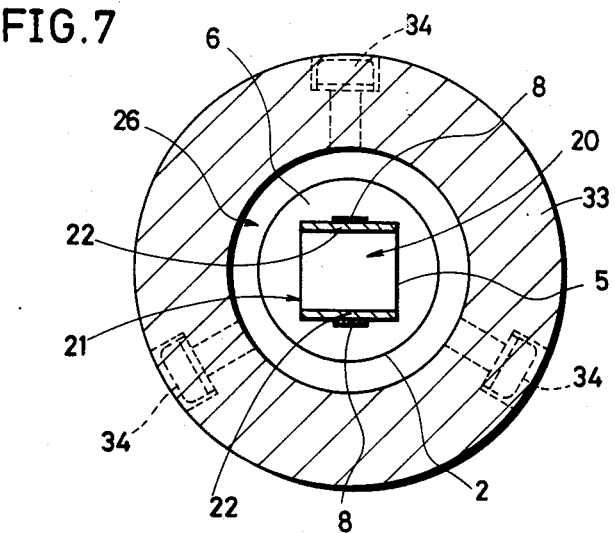
FIG. 7 is a cross-sectional view taken along the line VII—VII in FIG. 6.
Figure 8:
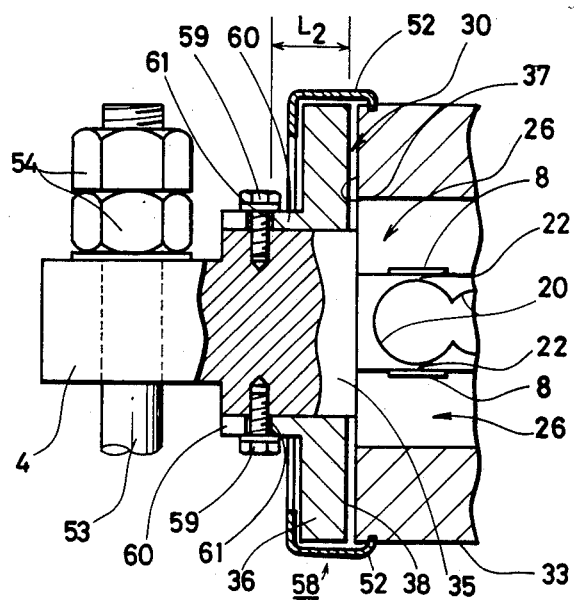
FIG. 8 is an enlarged partial view of a modification of the embodiment as shown in FIG. 6.

The beam type load cell 51 of FIGS. 6 and 7 according to the fourth embodiment of the invention comprises, similarly to the load cell 31 according to the second embodiment, a load cell body 2 having a strain gage carrying portion 5 which is covered by a cylindrical cover 33 and a ring-shaped opposing surface member 36 shown in FIG. 8. In the present embodiment, a dustproof cover 52 made of rubber is mounted at one end to the peripheral surface of the left forward end of the cylindrical cover 33 for covering a gap 30 and a part of the ring-shaped opposing surface member 36, for preventing dust from entering the gap 30. The load receiving portion 4 is connected through a bolt 53 and a nut 54 with a measuring receiver 55 with a load receiving portion extending horizontally over the load cell body 2. The interior of a fixed portion 6 of the load cell body 2 is partially bored to define a through-hole 56 as shown by the dashed lines, whereby connecting electrical conductors (not shown) lead from the outside to strain gages 8 secured to the strain gage carrying portion 5. Further, the fixed portion 6 is provided at its right end with a flame proof terminal box 57 for covering the strain gage connecting conductors extending from the through-hole 56.

Since this embodiment is substantially identical in construction to the aforementioned second embodiment, explanation is omitted with respect to components having the same reference numerals as those in FIG. 4.

The load cell 58 of the embodiment shown in FIG. 8, has a ring-shaped opposed surface member 36 mounted with its projecting ring section 60 by screw bolts 59 to a rounded outer peripheral surface 35 of a load receiving portion 4, whereby the ring-shaped opposing surface member 36 is deformed. The screw bolts 59 pass through holes 61 in the projecting ring section 60. In this structure the length $L_2$ of a path between an internal space 26 to the nearest external space, i.e., the bolt hole 61 also has a predetermined safety size as in the aforementioned embodiment for preventing a flame propagation through said path.

This embodiment is substantially identical in construction to the aforementioned embodiment shown in FIG. 6 and thus an explanation is omitted with respect to other components having the same reference numerals as those in FIG. 6.

Figure 9:
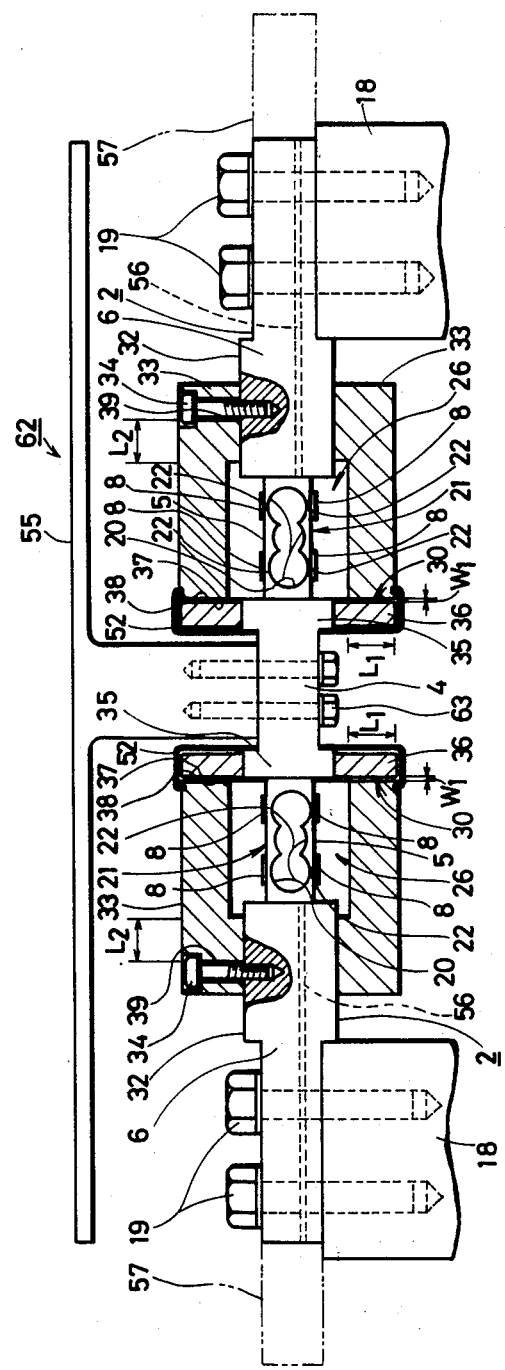
FIG. 9 is an elevational view, partially in section, of a sixth embodiment of the present invention wherein the embodiment shown in FIG. 6, is applied.

FIG. 9 shows an embodiment with a beam type load cell assembly 62 having a so-called twin tong structure and comprising two load arranged symmetrically about a load receiving portion 4. A load support or receiver 55 with a T-shaped configuration, is fixed to the central load receiving portion 4 by bolts 63. A symmetrical load cell body 2 is preferably formed by machining a cylindrical resilient material.

The load cell assembly 62 is suitable for measuring large loads as compared to the embodiment of FIG. 6 in which a load is applied in a cantilever manner.

Figure 10:
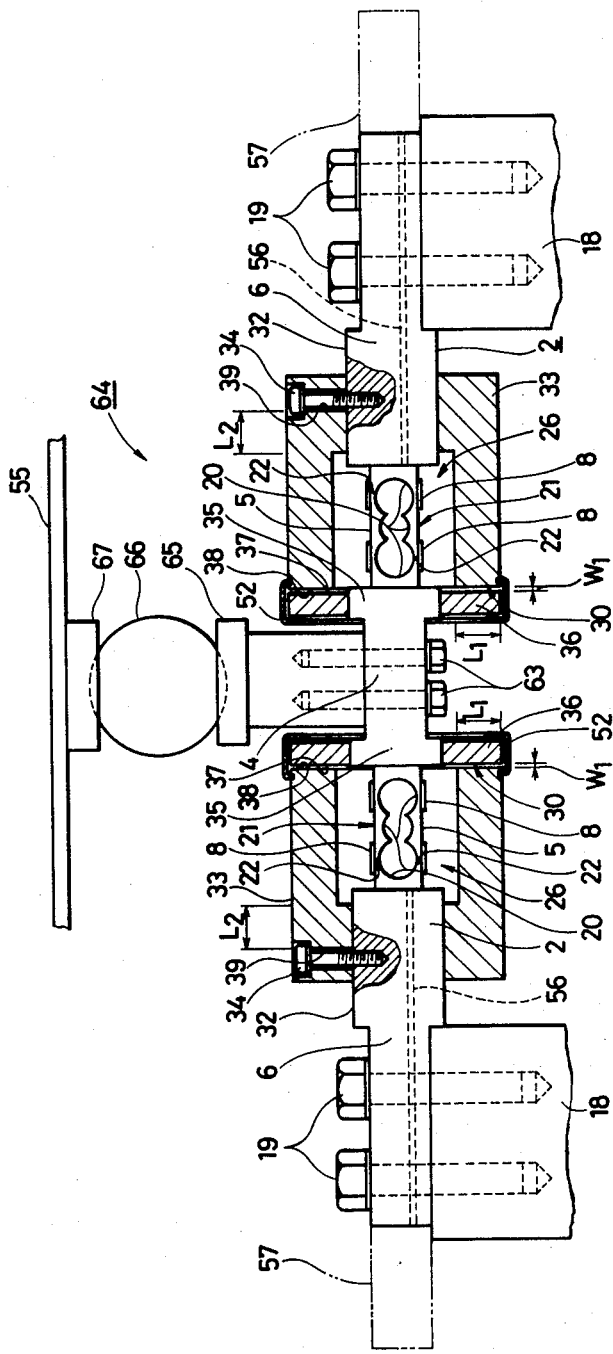
FIG. 10 is an elevational view, partially in section, of a seventh embodiment of the present invention which is a modification of the embodiment as shown in FIG. 9.

FIG. 10 shows an embodiment similar to FIG. 9, but having a lower spherical bearing 65 fixed by a bolt 63 to a load receiving member 4 so that a load carrying platform 55 having an upper spherical bearing 67 is mounted thereto through a ball 66. Thus, the direction of the upper surface of the measuring receiver 55 can freely be changed by the ball 66 to facilitate the application of a load to be measured. Parts in FIG. 10 having the same reference numbers as FIG. 9 are not described again.

Figure 11:
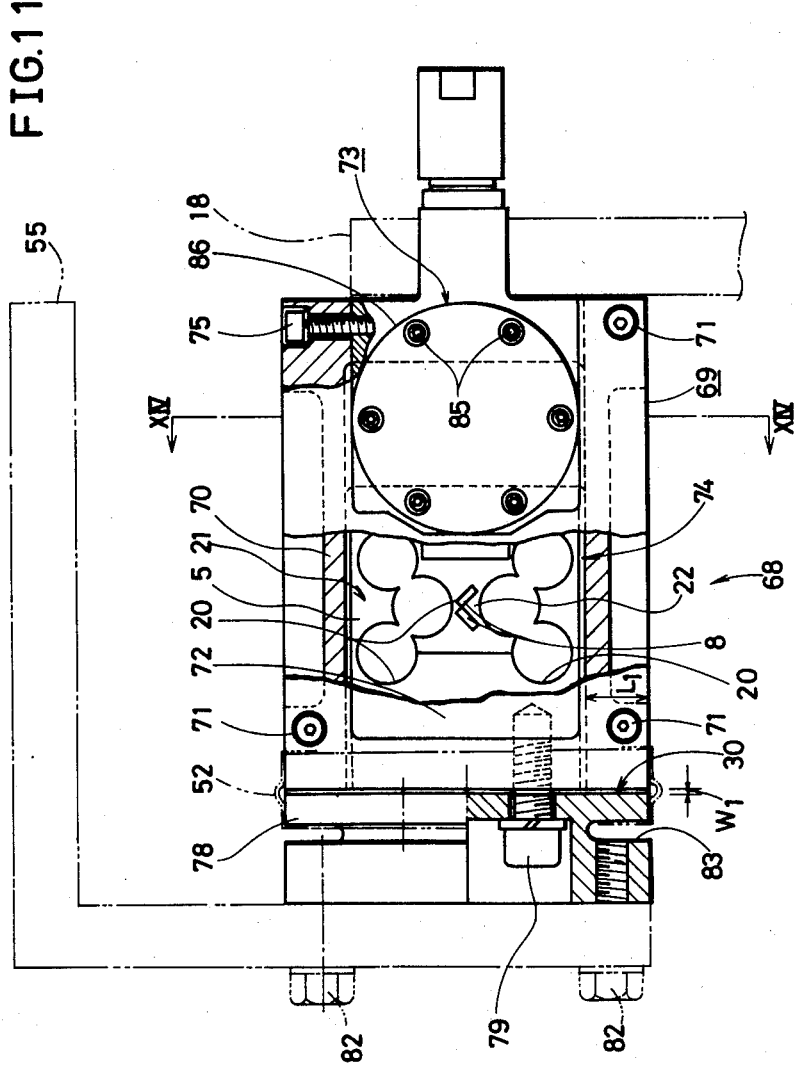
FIG. 11 is a partially sectioned front elevational view of a beam type load cell according to an eighth embodiment of the present invention with part of the housing broken away.
Figure 12:
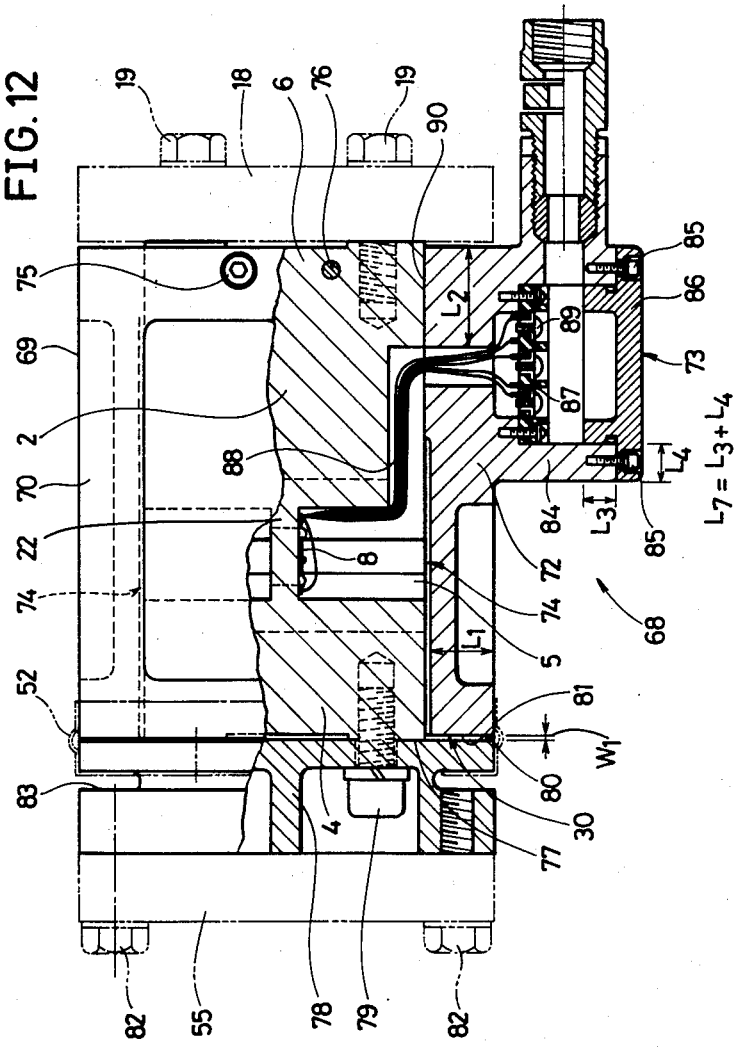
FIG. 12 is a partially sectioned plan view of the embodiment as shown in FIG. 11 also with part of the housing broken away.

Referring to FIGS. 11 to 14, a load cell 68 comprises a shear type load cell body 2 in the form of a square bar. In FIG. 12, the load cell body 2 is fixed at its right end 6 to a fixed support 18 by bolts 19. The load cell body 2 is provided in its center with a strain gage carrying portion 5 having a plurality of through-holes, for example, a pair of three through-holes 20, respectively penetrating upper and lower central portions of the load cell body 2 as shown in FIG. 11 and forming a thinned portion 22 between the front and rear sides of the load cell body 2, whereby a three beam type Roberval mechanism 21 results. Strain gages 8 are secured to the front and rear sides of the thinned portion 22.

Figure 13:
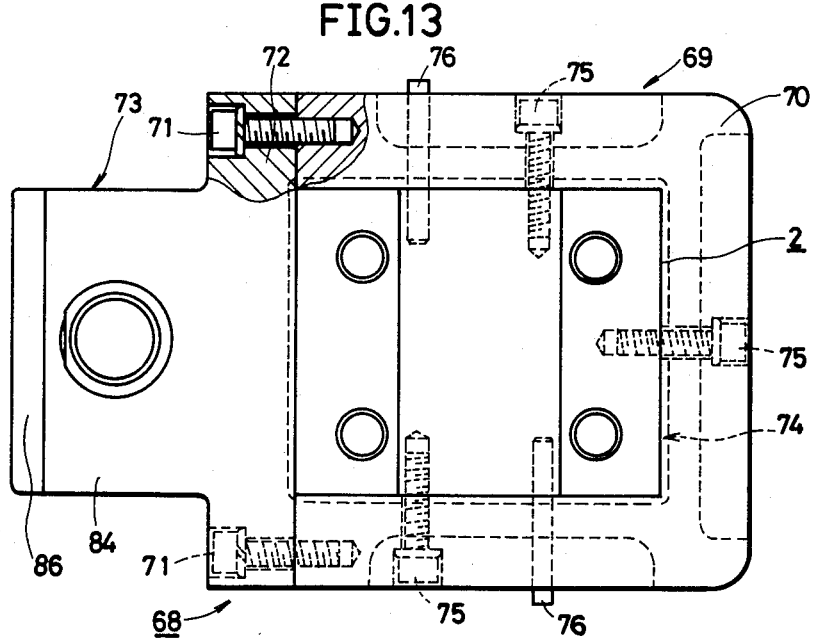
FIG. 13 is a partially sectioned side elevational view of the embodiment as shown in FIG. 11.
Figure 14:
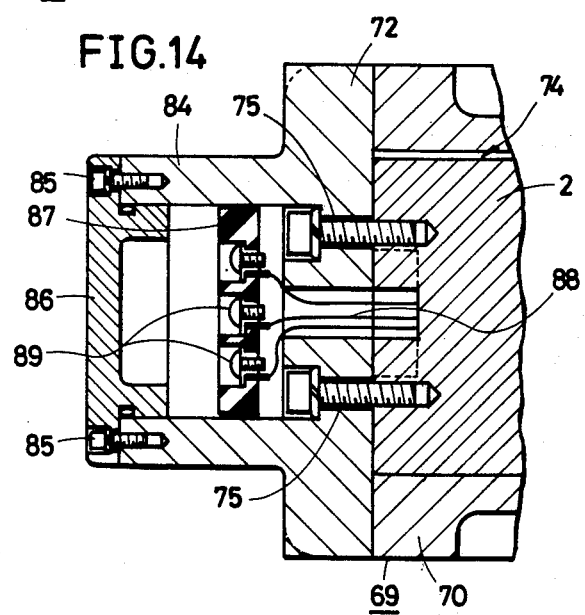
FIG. 14 is a partial sectional view of the embodiment of FIG. 11 taken along line XIV—XIV in FIG. 11.

As shown in FIGS. 13 and 14, the load cell body 2 is mounted in a flame proof cylinder 69, except that the left end portion of the body 2 is not covered by the cylinder 69. The flame proof cylinder 69 is formed by a U-shaped frame member 70 and a lid 72 which is connected to an open end surface of the frame member 70 by bolts 71. The lid member 72 is integrally provided with a flame proof terminal box 73 as described below.

As shown in FIGS. 12 and 13, a slight gap 74 is defined between the load cell body 2 and the flame proof cylinder 69, except where the load cell body 2 contacts the inner peripheral surface of the flame proof cylinder 69. An adhesive agent, bolts 75, and a pin 76 may be used to hold the body 2 in place. Thus, the strain gage carrying portion 5 and a load receiving portion 4 of the load cell body 2 are maintained displaceable with respect to the flame proof cylinder 69, except for the right end fixed portion 6.

In FIG. 12, a flame proof end plate 78 is mounted to a forward left end surface 77 of the load cell body 2, e.g., by bolts 79. One main surface 80 of the flame proof end plate 78 in contact with the load cell body 2, is extended to be wider than the forward end surface 77 of the load cell body 2, whereby a gap 30 is defined between the main surface 80 of the flame proof end plate 78 and a left end surface 81 of the flame proof cylinder 69. The width $W_1$ and length $L_1$ of the gap 30 are selected as described above, to provide the flame proof function.

A load input member 55 is fixed to the left end of the flame proof end plate 78 by bolts 82. Further, an annular groove 83 is formed in the outer peripheral surface of the flame proof end plate 78, so as to prevent varying the width $W_1$ of the gap 30 by an excessive tightening of the bolts 82.

The flame proof terminal box 73 in the lid member 72 of the cylinder 79 will now be described. As shown in FIGS. 12 and 14, the flame proof terminal box 73 includes a main body 84 integrally provided in the lid member 72 and a cap 86 fixed to an open portion of the main body 84 by bolts 85. A terminal plate 87 is arranged in the main body 84, so that ends of strain gage connecting conductors 88, the other ends of which are connected with the strain gages 8, are connected to the terminal plate 87 by small screws 89 as shown in FIG. 12.

For preventing a flame propagation through an interface 90 between the fixed portion 6 of the load cell body 2 and the lid member 72 of the flame proof cylinder 69, a length $L_2$ is shown in FIG. 12, having a predetermined size based on, e.g., "Industrial Safety Institute Technical Guideline" as in the aforementioned embodiments. A length $L_3$ and a length $L_4$ are provided for preventing a flame propagation through any clearance between the cap 86 and the main body 84 of the flame proof terminal box 73. The sum of $L_3+L_4=L_7$ is selected to exceed a predetermined size.

The flame proof cylinder 69 and the flame proof end plate 78 are preferably made of material such as an aluminum alloy or stainless steel with plated nickel surfaces, so that the gap 30 is not narrowed by rust or the like.

Further, the gap 30 is preferably covered by a dust-proof cover 52 made, e.g., of rubber for preventing any entrance of dust.

Figure 15:
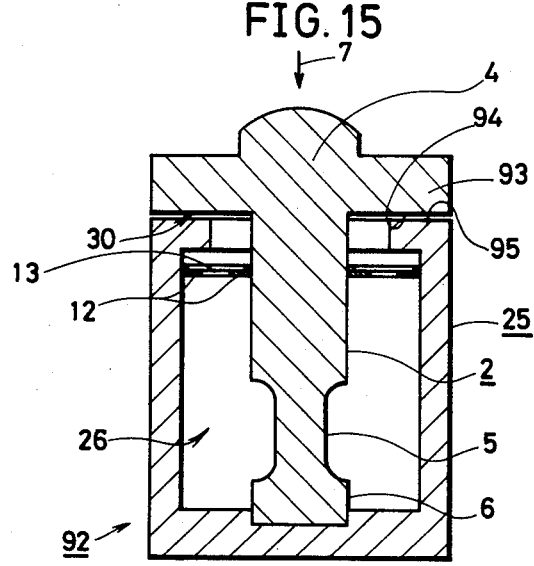
FIG. 15 shows a sectional view through a ninth embodiment of the present invention applied to a compression type load cell.
Figure 16:
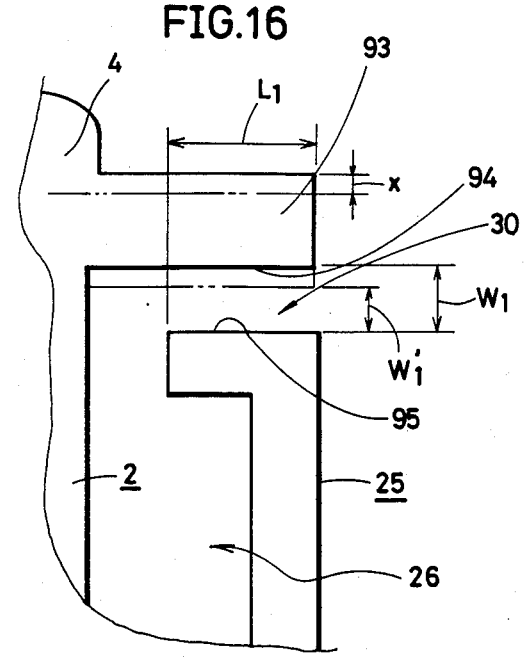
FIG. 16 is an enlarged partial view of the embodiment shown in FIG. 15.

The embodiment of FIGS. 15 and 16 is similar to that of the first embodiment shown in FIG. 3.

A flange 93 is integrally provided on the upper end of a load receiving portion 4 of a load cell body 2. A gap 30 is defined between a lower surface 94 of the flange 93 and an upper end surface 95 of a flame proof enclosure 25. Elements having the same reference numbers as in FIG. 3 are not described in detail again.

In FIGS. 15 and 16 the length $L_1$ extends perpendicularly to that of a load 7. Therefore, when the load 7 is applied to the load cell body 2 to deform a load receiving portion 4 by x, the gap width $W_1$ is reduced as follows $W_1'=W_1-\Delta W(W_1-x)$. In this case, when the gap width $W_1$ has been determined to satisfy the aforementioned flame proof condition in an unloaded state, the reduced gap width $W_1'$ is smaller than the gap width $W_1$ in a loaded state, whereby desired flame proof function can be attained both in the unloaded and loaded states.

Figure 17:
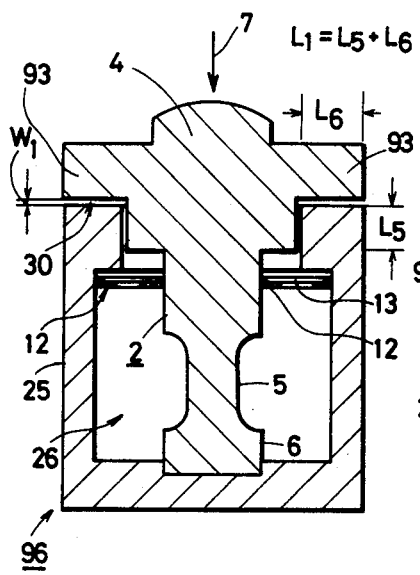
FIG. 17 shows a sectional view of a tenth embodiment of the present invention which is a modification of the embodiment shown in FIG. 15.

FIG. 17, showing a tenth embodiment combining the embodiments of FIGS. 3 and 16, whereby the length of the gap 30 has a vertical component $L_5$ and a horizontal component $L_6$. Components with reference numbers already described are not described again.

Figure 18:
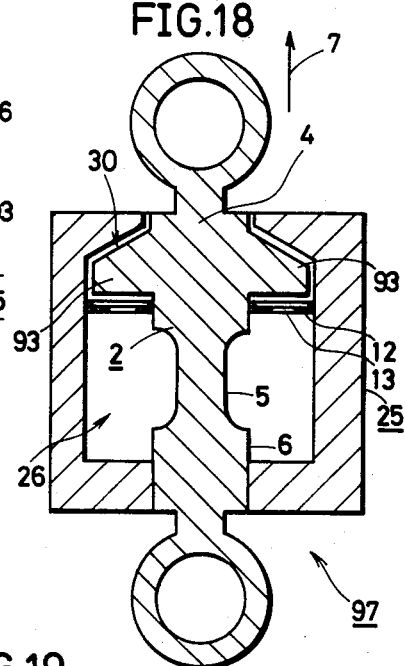
FIG. 18 shows a sectional view of an eleventh embodiment of the present invention applied to a basic tension type load cell.
Figure 19:
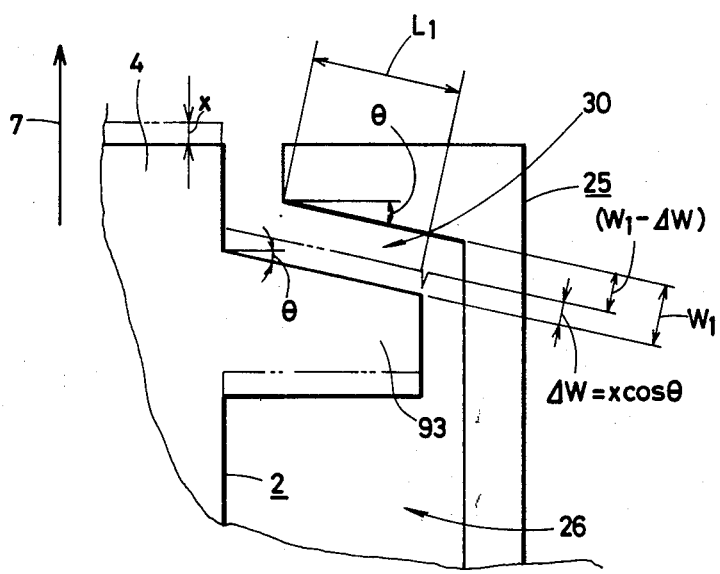
FIG. 19 is an enlarged partial view of the embodiment shown in FIG. 18.

In FIGS. 18 and 19, components identical to those in FIGS. 15 and 16 are indicated by the same reference numerals. In the tension type load cell 97 shown in FIGS. 18 and 19, a gap 30 is inclined by an angle $\theta$ with respect to the horizontal. Thus, the normal gap width $W_1$ in an unloaded state, is reduced by a distance $\Delta W$ when a tension load 7 is applied to the load cell body 2 causing a displacement by a distance x.

Since $\Delta W=x\cos\theta$, this distance $\Delta W$ can be reduced by making the angle $\theta$ large, whereby the load cell body 2 is prevented from contacting the flame proof enclosure 25 even if the amount of displacement thereof is increased by the application of a large load.

Since, the gap width $W_1$ is narrowed also in this embodiment, by displacement of the load cell body 2, the flame proof function of the load cell can effectively be maintained both in the unloaded and in the loaded states by setting the gap width $W_1$ to a predetermined size.

Although the gap width $W_1$ is reduced in a loaded state in each of the compression type load cells 92 and 96 and in the tension type load cell 97 as explained with reference to FIGS. 15 to 19, the gap width $W_1$ may be widened in the loaded state. In such a case, the gap width $W_1$ of the gap 30 upon application of the maximum load may be found thereby to determine the width in an unloaded state.

Figure 20:
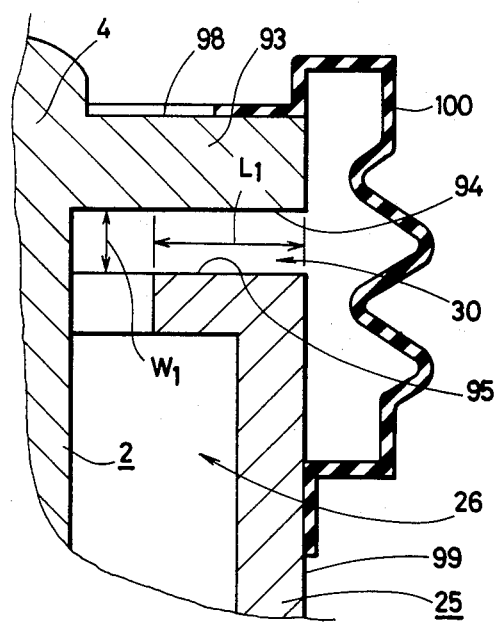
FIGS. 20 to 24 are enlarged, sectional views of essential portions of embodiments of the present invention with water-proof and dust-proof features.

FIG. 20 shows a load cell 92 according to, for example, the embodiment shown in FIGS. 15 and 16 with dust-proof and water-proof features. A bellows 100 made of rubber is mounted at both its ends to an upper surface 98 of a flange 93 of a load cell body 2 and a side surface 99 of a flame proof enclosure 25 respectively, e.g., by an adhesive. The bellows 100 is adapted to cover the exterior of the entire peripheral surface of a gap 30, thereby making the gap 30 dust-proof and water-proof.

Figure 21:
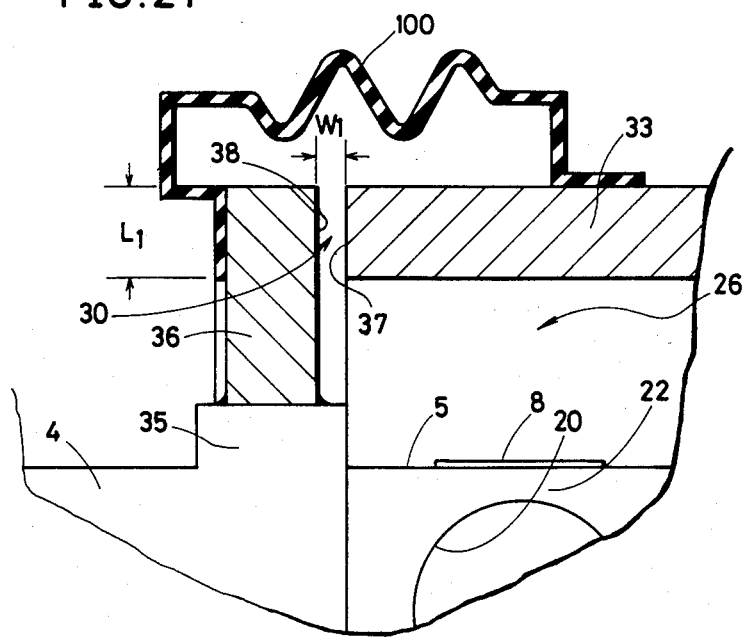

Such a bellows 100 may be applied to compression type load cells 24, 92 and 96 and to the beam type load cells 31, 40, 51, 58, 62, 64, and 68 as shown in FIG. 21, and similarly to the tension type load cell 97.

Figure 24:
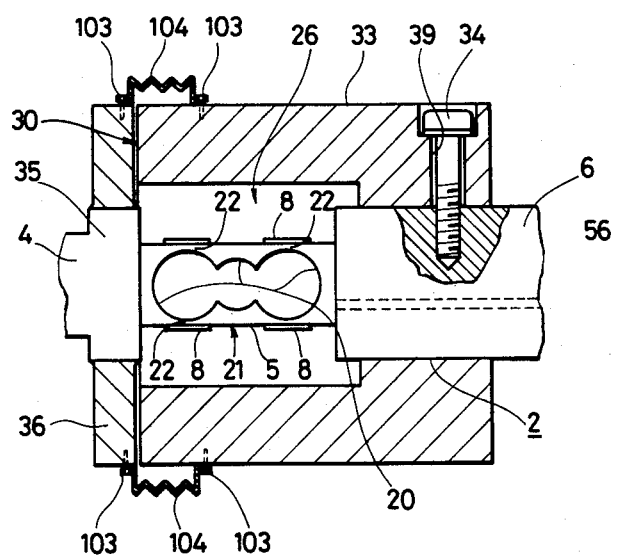

The bellows 100 as employed in the aforementioned embodiment, may be replaced by a bellows 14 of metal which is fixed by bolts 103 as shown in FIG. 24. Alternately, the metal bellows 104 may be fixed by an adhesive or the like.

Figure 22:
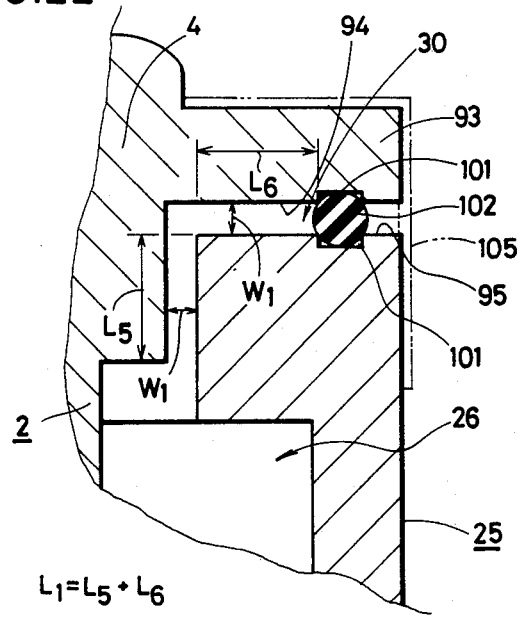

FIG. 22 shows another example of a dust-proof and water-proof construction, wherein, for example, the embodiment of FIG. 17 is provided with dust-proof and water-proof features. An upper end surface 95 of a flame proof enclosure 25 and a lower surface 94 of a flange 93 of a load cell body 2 are respectively provided with annular grooves 101 facing each other and holding an O-ring 102, e.g., of silicon. With respect to the gap 30, communication between the interior 26 of the load cell and the exterior thereof is prevented by the O-ring 102. In this case, the O-ring 102 fitted in the annular grooves 101 does not interfere with providing a sufficient gap length $L_1$ for the intended flame proof function, because the gap length $L_1=L_5+L_6$.

Figure 23:
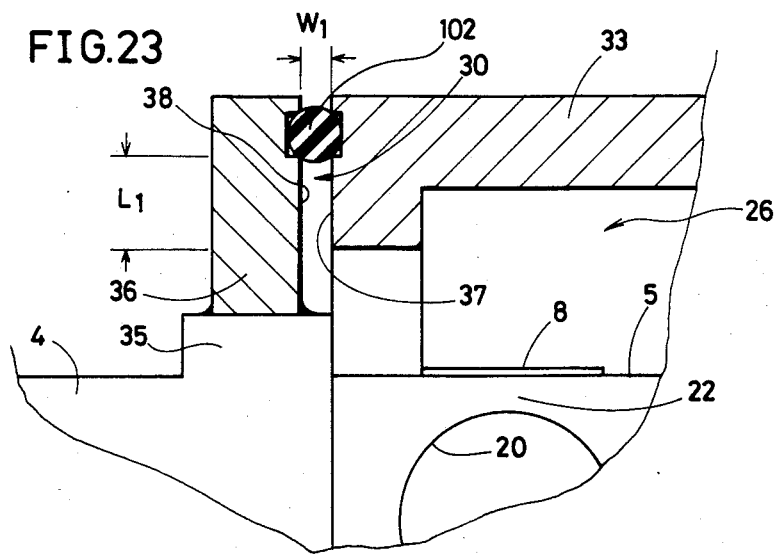

FIG. 23 shows the construction of a beam type load cell 40, 51, 58, 62 or 64 with a dust-proofing and water-proofing O-ring 102, which may be applied to any type of load cell provided that the length $L_1$ of the gap 30 is longer than a predetermined size excluding the portion holding the O-ring.

The dust-proof and water-proof construction as hereinabove described with reference to FIGS. 20 to 24 may be applied to all of the embodiments of the present invention to effectively prevent entrance of dust and water into the flame proof enclosure containing the load cell body, whereby the load cell can be stably operated for a long time even under severe operating conditions.

In a case where the gap width $W_1$ is hardly changed, a film 105 may be employed for the dust-proofing and water-proofing as shown in FIG. 22.

Although the present invention has been described and illustrated in detail, it is clearly understood that the same is by way of illustration and example only and is not to be taken by way of limitation, the spirit and scope of the present invention being limited only the the terms of the appended claims.

What is claimed is:

1. A load cell having a flame proof function, comprising: a load cell body including a fixed mounting portion, a load/electric signal converting portion for converting a load into an electric signal, and a load receiving portion connected with said load/electric signal converting portion of said load cell body for receiving said load and transmitting the same to said load/electric signal converting portion in a predetermined load direction; flame proof enclosure means directly and exclusively containing said load cell body and having an opening for outwardly exposing said load receiving portion and for permitting free movement of said load receiving portion in said opening, said fixed mounting portion of said load cell body being secured to said enclosure means; said load cell body having a first surface in the vicinity of said opening of said enclosure means, said first surface having a predetermined length, and said opening of said enclosure means having a second surface facing said first surface and extending along a length corresponding at least to said predetermined length, said first and second surfaces extending substantially in parallel to each other, said first and second surfaces being spaced from each other for defining a predetermined gap between said first and second surfaces, said gap having a predetermined gap width and a gap length corresponding to said length of said second surface, said gap width and said gap length being selected to keep energy of an explosion caused in said enclosure means within the interior of the enclosure means for preventing a flame propagation out of said enclosure means.

2. The load cell of claim 1, wherein said load receiving portion is a rod extending from said converting portion in a load application direction, said enclosure means comprising a closing portion extending in a direction perpendicular to said rod, said opening being a through-hole formed in said enclosure means for receiving said rod and for defining said gap, an inner wall of said through-hole forming said second surface, a side of said rod forming said first surface.

3. The load cell of claim 2, wherein said load cell body is a beam type load cell body extending in a direction perpendicular to said load direction.

4. The load cell of claim 2, wherein said load cell body is a compression type load cell body extending in the same direction as said load direction.

5. The load cell of claim 2, wherein said load cell body is a tension type load cell body extending in the same direction as said load direction.

6. The load cell of claim 2, wherein said enclosure means includes a first enclosure member (42) and a second enclosure member (44) forming said closing portion capable of opening and closing with respect to said first enclosure member (42).

7. The load cell of claim 1, wherein said enclosure means comprise a cylindrical body closed at one end and open at the other end and extending in the longitudinal direction, said load receiving portion of said load cell body extending outwardly of said open end, said other open end defining said opening of said enclosure means and forming said second surface, said load cell body having a closing surface member connected to said load receiving portion to extend along said open end of said cylindrical enclosure means for closing said enclosure means except for said gap, whereby said first surface is formed by said closing surface member forming part of said load cell body.

8. The load cell of claim 7, wherein said load direction of said load receiving portion is perpendicular to the longitudinal direction of said cylindrical body, and wherein said first and second surfaces extend in said load direction.

9. The load cell of claim 8, wherein said load cell body is a beam type load cell body extending to said longitudinal direction of said cylindrical body, one end of said beam type load cell body forming said fixed portion and an intermediate portion of said load cell body forming said load/electric signal converting portion for distortion by a load effective in said load direction.

10. The load cell of claim 7, wherein said load cell is a compression type load cell wherein said load direction of said load receiving portion is extending in the same direction as said longitudinal direction of said cylindrical body, and wherein said gap has such a width and length that flame propagation is prevented in an unloaded state and in a state in which the maximum load is applied.

11. The load cell of claim 10, wherein said first and second surfaces are inclined relative to said longitudinal direction of said cylindrical body.

12. The load cell of claim 10, wherein said first and second surfaces extend perpendicularly to said longitudinal direction of said cylindrical body.

13. The load cell of claim 7, wherein said load cell is a tension type load cell wherein said load direction of said load receiving portion is extending in the same direction as said longitudinal direction of said cylindrical body, and wherein said gap has such a width and length that flame propagation is prevented in an unloaded state and in a state in which the maximum load is applied.

14. The load cell of claim 13, wherein said first and second surfaces are inclined in said longitudinal direction of said cylindrical body.

15. The load cell of claim 13, wherein said first and second surfaces are perpendicular to said longitudinal direction of said cylindrical body.

16. The load cell of claim 7, further including an elastic covering member extending from said open end of said cylindrical body to said closing member for closing said gap.

17. The load cell of claim 16, wherein said covering member is a bellows.

18. The load cell of claim 16, wherein said covering member is an O-ring.

* * * * *

UNITED STATES PATENT AND TRADEMARK OFFICE
CERTIFICATE OF CORRECTION

PATENT NO. : 4,619,147

DATED : October 28, 1986

INVENTOR(S) : Shigeo Yoshimura, Yoshiaki Shimada, Hitoshi Kimura

It is certified that error appears in the above-identified patent and that said Letters Patent is hereby corrected as shown below:

Claim 9, line 2, (Col. 12, line 25) replace "to" by --in--.

Signed and Sealed this

Thirteenth Day of January, 1987

Attest:

DONALD J. QUIGG

*Attesting Officer*  *Commissioner of Patents and Trademarks*